3,005,015
POLYCYANOHEPTATRIENES AND A PROCESS
FOR THEIR PREPARATION
Lester R. Melby, Wilmington, Del., assignor to E. I. du Pont de Nemours and Company, Wilmington, Del., a corporation of Delaware
No Drawing. Filed Aug. 14, 1959, Ser. No. 833,696
8 Claims. (Cl. 260—464)

This application is concerned with a new class of organic compounds, and more particularly with a new class of multicyano compounds which are useful as dyes.

In U.S. 2,762,837 there is shown an addition reaction whereby one mole of tetracyanoethylene reacts in the presence of one or more moles of an α-hydrogen ketone to form an α-(1,1,2,2-tetracyanoethyl)ketone.

It has now been discovered that with a particular group of α-hydrogen ketones, viz., the α,α,α',α'-tetrahydrogen ketones, when one mole of such a ketone reacts in the presence of two or more moles of a tricyanovinyl halide or cyanide, the α-(1,2,2-tricyanoethyl)ketone which first forms can be made to react further with a second mole of the tricyanovinyl halide or cyanide, with the elimination of two moles of hydrogen halide or hydrogen cyanide, respectively, to yield a 1,1,2,6,7,7-hexacyano-4-hydroxy-1,3,5-heptatriene.

The 1,1,2,6,7,7-hexacyano-4-hydroxy-1,3,5-heptatrienes may exist in several possible tautomeric structures formed by proton shifts, as in enolization of the original keto group and migration of double bonds as well as isomerization by ring closure. These various forms exist not only in dynamic equilibrium, but, as will be shown in the examples, some of the isomers are stable and can be prepared separately by suitable process variations. It is to be understood that the hydroxyheptatriene terminology used in the examples is selected for convenience in naming the products of the invention.

The process for preparing 1,1,2,6,7,7-hexacyano-4-hydroxyl-1,3,5-heptatrienes can be indicated by the following equation:

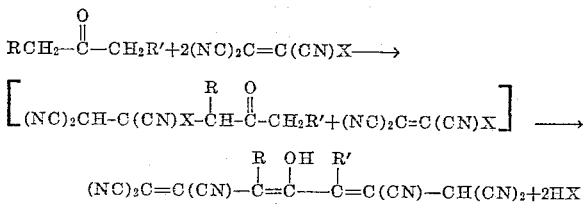

where R and R' can be the same or different and represent hydrogen or hydrocarbyl groups or together they can form a hydrocarbyl diradical and X can be halogen (fluorine, chlorine, bromine or iodine) or cyano. The strongest dyes in this group are those in which at least one of R and R' are hydrogen.

The process of this invention can be carried out by simply bringing together the selected ketone and tricyanovinyl halide or cyanide. If given sufficient time, they will react to produce a 1,1,2,6,7,7-hexacyano-4-hydroxy-1,3,5-heptatriene at room temperature. It is often convenient to accelerate the reaction by heating. Temperatures of 70° C. and higher are preferred, particularly temperatures in the range of 70–200° C.

No solvents or diluents are required for operability of the process. However, the presence of a diluent inert to the reactants and products aids in control of dissipation of the heat of reaction and therefore represents a preferred procedure. Suitable diluents include dimethylformamide, acetonitrile, dimethylacetamide, tetramethylurea, dimethyl sulfoxide, tetramethylenesulfone, nitrosodimethylamine, and 2,2,2-trifluoroethanol. Of these diluents, dimethylformamide is particularly preferred.

Pressure is not a critical factor in the reaction of this invention, and atmospheric pressure is therefore preferred although pressures above and below atmospheric pressure are operable.

In the embodiment of the present invention employing tetracyanoethylene, the tetracyanoethylene may be added as such or it may be prepared in situ from 1,1,2,2-tetracyanoethanesulfonic acid or one of its salts, particularly one of the tetraalkylammonium salts, as described in U.S. 2,809,972.

The net effect of reacting first one molecule of tetracyanoethylene and then one molecule of a tricyanovinyl halide with one molecule of a ketone may be obtained by reacting an α-(1,1,2,2-tetracyanoethyl)ketone with tricyanovinyl chloride to obtain a 1,1,2,6,7,7-hexacyano-4-hydroxy-1,3,5-heptatriene.

It will be noted from the examples which follow that the 1,1,2,6,7,7-hexacyano - 4 - hydroxy-1,3,5-heptatrienes of this invention are highly colored compounds which are generically useful as dyes for textiles.

By the term "hydrocarbyl," used in defining the products and process of this invention, is meant any organic radical composed solely of carbon and hydrogen. It will be understood that the term is used in its full generic sense. The wide variation in the hydrocarbyl groups used in the illustrations which follow makes it evident that all hydrocarbyl groups are operable. Hydrocarbyl groups may vary as to whether they are saturated, unsaturated, alkyl, cycloalkyl, aryl, aralkyl, alkaryl, single ring, multi ring, straight chain, branched chain, large, small, and the like. The widest variation of this sort does not in any way detract from the fundamental characteristic of the hydrocarbyl radical of passing unchanged through the process of this invention and exercising no effect whatever on the chemical steps of the process.

The limitations of space for disclosure are not to be construed as any limitation within the scope of "hydrocarbyl" contemplated in this invention. Even the most cumbersome hydrocarbyl radicals such as those obtained by removing end groups from high molecular weight hydrocarbon polymer molecules containing thousands of carbon atoms, such as polyethylene, polyisobutylene, polyisoprene, polystyrene, and the like, are fully operable.

It is obvious that hydrocarbyl groups containing 20 or fewer carbon atoms are most available, and to that extent preferred. But there is to be no question of the operability of, or of the intent to include and disclose, any hydrocarbyl group whatsoever. Except for factors of bulk and dilution, wide variations in size and structure of hydrocarbyl radicals have no effect on the color of the dyes to which they are attached. All dyes of this invention obtainable by variation of hydrocarbyl groups within the above definitions are hereby disclosed. Routineering to disclose each and every possible hydrocarbyl embodiment is superfluous.

In the following examples parts are by weight unless otherwise indicated.

*Example I*

To a 10% solution of methyl methacrylate polymer in methyl ethyl ketone is added a small amount of tetramethylammonium tetracyanoethanesulfonate containing a trace of hydrogen chloride. The ketone solution is allowed to stand for about one-half hour at room temperature, during which time it turns slightly blue in color. The solution is coated onto paper and dried for several minutes in air. The resulting coated paper is pressed for five seconds against a metal engraving heated at about 120° C. A bright blue image of the engraving forms on the coated paper, due to the formation of 1,1,2,6,7,7-hexacyano-4-hydroxy-5-methyl-1,3,5-heptatriene.

The above preparation is repeated as follows: In 500 parts of a 5% solution of methyl methacrylate polymer in methyl ethyl ketone is dissolved 25 parts of tetramethylammonium tetracyanoethanesulfonate and about 5 parts of 3N hydrochloric acid. The solution is brought quickly to the boiling point and then quickly cooled to room temperature. The resulting water-white composition is coated onto paper and dried in air for about ten minutes. When the coated paper is pressed for five seconds against a metal engraving heated at about 125° C., a bright blue image of the engraving is formed, due to the formation of 1,1,2,6,7,7-hexacyano-4-hydroxy-5-methyl-1,3,5-heptatriene in the heated areas.

In the above procedure, tetraethylammonium tetracyanoethanesulfonate or tetra-n-propylammonium tetracyanoethanesulfonate may be substituted for tetramethylammonium tetracyanoethanesulfonate, and 3 N sulfuric acid and p-toluenesulfonic acid monohydrate may be substituted for the hydrochloric acid. With all of these variations, an image appears, due to the formation of 1,1,2,6,7,7-hexacyano - 4 - hydroxy-5-methyl-1,3,5-heptatriene.

*Example II*

One part of tetramethylammonium tetracyanoethanesulfonate is dissolved in about 50 parts of methyl ethyl ketone. The solution is boiled for ten minutes, during which time it turns dark blue and then black. The product is drowned in water and extracted with ether. The ether extract is concentrated by evaporation to precipitate 1,1,2,6,7,7-hexacyano - 4 - hydroxy-5-methyl-1,3,5-heptatriene as a black solid which gives a deep blue color when dissolved in acetone. The acetone solution shows an absorption maximum at 589 millimicrons and minor absorption peaks at 340, 351, 393, and 412 millimicrons.

DYEING EXAMPLE A

To a hot solution of 2 parts of a sulfonated lignin dispersant and about 5 parts of glacial acetic acid in 5000 parts of water is added a solution of 4 parts of 1,1,2,6,7,7-hexacyano - 4 - hydroxy-5-methyl-1,3,5-heptatriene in 279 parts of ethylene glycol monoethyl ether. Swatches of cellulose acetate, polyethylene terephthalate, nylon, and wool fabrics are placed in this solution and boiled for 20 minutes. The cloth swatches are then removed, rinsed in water, and dried. The cellulose acetate is dyed greenish blue; polyethylene terephthalate is dyed light blue; nylon is dyed greenish black; and wool is dyed brownish black.

*Example III*

A solution of 100 parts of tetramethylammonium tetracyanoethanesulfonate, 6.5 parts of p-toluenesulfonic acid, and 1610 parts of methyl ethyl ketone is allowed to stand at room temperature for 48 hours. Tetramethylammonium p-toluenesulfonate (M.P. 249–251° C.) precipitates and is removed by filtration. The filtrate is poured into a large volume of ether. The resulting solution is filtered and the filtrate evaporated to dryness to obtain 56 parts of solid product. This is recrystallized three times from chloroform to obtain 21 parts of white crystals of 5,5,6,6-tetracyano-3-hexanone.

*Analysis.*—Calcd. for $C_{10}H_8N_4O$: C, 60.0; H, 4.0; N, 28.0. Found: C, 59.6; H, 3.8; N, 28.4.

A solution of equal parts of 5,5,6,6-tetracyano-3-hexanone and tetramethylammonium tetracyanoethanesulfonate in an excess of methyl ethyl ketone containing methyl methacrylate polymer as a binder is coated on paper and dried. The coated paper is pressed for five second against a metal engraving heated at 125° C. An intense blue-green image of the engraving develops, due to the formation of 1,1,2,6,7,7-hexacyano-4-hydroxy-5-methyl-1,3,5-heptatriene. Similar solutions containing 5,5,6,6-tetracyano-3-hexanone or tetramethylammonium tetracyanoethanesulfonate alone in methyl ethyl ketone give only feeble images when coated on paper and heated by contact with a metal engraving.

*Example IV*

Small amounts of tetracyanoethylene and 5,5,6,6-tetracyano-3-hexanone are dissolved in methyl ethyl ketone containing methyl methacrylate polymer as a binder. The solution is coated onto paper, dried, and then pressed against a heated metal engraving as previously described. With the engraving at 125° C., a faint blue image forms; at 140° C., a more intense blue image forms; and at 200° C., a strong blue image is obtained. These images are due to the presence of 1,1,2,6,7,7-hexacyano-4-hydroxy-5-methyl-1,3,5-heptatriene.

*Example V*

To a 10% solution of tetracyanoethylene in methyl ethyl ketone is added 2 parts of boron fluoride etherate for each 100 parts of solution. The solution is allowed to stand at room temperature for three days. Excess ketone is evaporated under a stream of nitrogen, and 5,5,6,6-tetracyano-3-hexanone is separated from 3-methyl-4,4,5,5-tetracyano-2-pentanone by extraction with hot chloroform in which the latter higher melting isomer is substantially insoluble.

In 2,834 parts of dimethylformamide is dissolved 200 parts of 5,5,6,6-tetracyano-3-hexanone and 128 parts of tetracyanoethylene. The solution is warmed at 75–80° C. for 20 minutes, during which time it turns an intense blue color. The solution is cooled to 0° C., and the solid 1,1,2,6,7,7 - hexacyano-4-hydroxy-5-methyl-1,3,5 - heptatriene which precipitates is collected on a filter. The dark glistening green platelets give a blue solution in acetone. The product is purified by dissolving in dimethylformamide and reprecipitating by addition of an equal volume of water. The yield of recrystallized product is 66 parts. It melts above 300° C. An acetone solution shows an absorption maximum at 620 millimicrons with a molecular extinction coefficient of 31,400. This dye is further purified by recrystallization from glacial acetic acid.

*Analysis.*—Calcd. for $C_{14}H_6N_6O$: C, 61.3; H, 2.2; N, 30.6. Found: C, 61.1; H, 2.5; N, 31.3.

*Example VI*

To 945 parts of dimethylformamide is added 72 parts of methyl ethyl ketone and 260 parts of tetracyanoethylene. The solution is heated at 80° C. for 40 minutes. Dilution with water precipitates 1,1,2,6,7,7-hexacyano-4-hydroxy-5-methyl-1,3,5-heptatriene as an almost black solid. This is recrystallized from glacial acetic acid to give the product in the form of glistening green crystals which melt above 300° C.

*Example VII*

In 1,893 parts of dimethylformamide is dissolved 128 parts of tetracyanoethylene and 186 parts of 4,4,5,5-tetracyano-2-pentanone. The solution is heated at 75–80° C. for 15 minutes, diluted with an equal volume of water, cooled, and filtered to obtain 36 parts of crystalline 1,1,2,6,7,7-hexacyano-4-hydroxy-1,3,5-heptatriene as an almost black solid melting above 300° C. An acetone solution of this dye is deep blue in color. It is purified by dissolving in dimethylformamide and reprecipitating with water. An acetone solution shows an absorption maximum at 632 millimicrons with a molecular extinction coefficient of 35,960.

*Analysis.*—Calcd. for $C_{13}H_4N_6O$: C, 60.0; H, 1.5. Found: C, 59.5; H, 2.4.

*Example VIII*

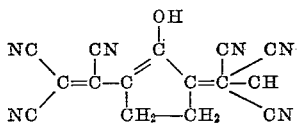

A solution of 64 parts of tetracyanoethylene and 110 parts of 2-(1,1,2,2-tetracyanoethyl)cyclopentanone in 945 parts of dimethylformamide is heated at 75–80° C. for 15 minutes, diluted with an equal volume of water, cooled, and filtered to obtain 34 parts of 5-(1,2,2-tricyanoethylidene)-2-tricyanovinylcyclopenten-1-ol, a solid blue dye melting above 300° C. In acetone solution it shows an absorption maximum at 618 millimicrons.

DYEING EXAMPLE B 5-(1,2,2 - tricyanoethylidene) - 2 - tricyanovinylcyclopenten-1-ol is substituted for 1,1,2,6,7,7-hexacyano-4-hydroxy-5-methyl-1,3,5-heptatriene in the process of Dyeing Example A. By this process, cellulose acetate is dyed deep blue, nylon is dyed a deep olive drab, silk is dyed brownish black, and wool is dyed brownish black.

*Example IX*

A mixture of 945 parts of dimethylformamide, 65 parts of phenyl acetone, and 128 parts of tetracyanoethylene is heated at 75–80° C. for 15 minutes, diluted with an equal volume of water, cooled, and filtered to obtain a sticky solid product. This is dissolved in a small volume of ethanol which is then diluted with water to yield 1,1,2,6,7,7 - hexacyano - 4 - hydroxy - 5 - phenyl-1,3,5-heptatriene as a blue solid. In acetone solution, it shows an absorption maximum at 590 millimicrons.

DYEING EXAMPLE C 1,1,2,6,7,7 - hexacyano - 4 - hydroxy - 5 - phenyl-1,3,5-heptatriene is employed as a dye in the procedure of Dyeing Example A. The dye bath is heated at 80° C. for ten minutes. From this procedure, cellulose acetate is dyed blue, nylon is dyed purple, silk is dyed olive drab, and wool is dyed reddish brown.

*Example X*

A solution of 80.23 parts of tricyanovinyl chloride in 161 parts of methyl ethyl ketone is heated at about 80° C. for 1.5 hours. The reaction mixture turns dark blue and hydrogen chloride is evolved. Excess solvent is then removed under vacuum and the product dissolved in ethyl acetate and chromatographed on 14,000 parts of acid alumina, using ethyl acetate as the eluant. After an initial 7200 parts of brown solution, about 49,500 parts of intense blue solution is collected. This is followed by blue solutions with bright orange-red fluorescence. The intensely blue solution is concentrated, rechromatographed, and the product recrystallized twice from ethyl acetate to yield 29.5 parts of 1,1,2,6,7,7-hexacyano-4-hydroxy-5-methyl-1,3,5-heptatriene in the form of light green needles. These needles decompose without melting between 280 and 290° C. The absorption spectrum in ethanol shows maxima at 622, 351, and 340 millimicrons with molecular extinction coefficients of 28,000, 9,600, and 8,600, respectively. The dye dissolves readily in 0.1 N sodium hydroxide to give an intensely red solution with an absorption maximum at 490 millimicrons (molecular extinction coefficient, 13,600) which is unchanged after three hours. Acidification of the basic solution regenerates the blue dye.

*Analysis.*—Calcd. for $C_{14}H_6N_6O$: C, 61.3; H, 2.2; N, 30.6. Found: C, 60.5, 60.1; H, 2.4, 2.3; N (K), 30.4, 30.5.

*Example XI*

To a solution of 140 parts of tricyanovinyl chloride in 402 parts of methyl ethyl ketone is added 378 parts of dimethylformamide. The temperature of the resulting solution rises spontaneously to 50° C. over a six-minute period. After ten minutes, the solvents are removed under vacuum. The remaining blue-black oil is taken up in a solution of 7,920 parts of acetone and 4,280 parts of ether and passed over 18,000 parts of acid alumina in a chromatographic column. A total of 22,800 parts of the ether-acetone mixture is required to remove the initial deep blue band. Concentration of this solution yields 53 parts of an opaque solid. Rechromatographing, followed by two recrystallizations from acetone, yields 35.6 parts of an isomer of 1,1,2,6,7,7-hexacyano-4-hydroxy-5-methyl-1,3,5-heptatriene in the form of glistening gold needles which melt with decomposition at 244–246° C. The dye is soluble in alcohols, ethyl acetate, acetone, and dimethylformamide; sparingly soluble in benzene, chloroform, and methylene chloride; and insoluble in hydrocarbon solvents and carbon tetrachloride. The absorption spectrum in ethanol shows maxima at 668 and 380 millimicrons with shoulders at 630 and 370 millimicrons. The corresponding molecular extinction coefficients are 20,400, 19,900, 18,600, and 18,900, respectively. The dye dissolves in aqueous alkali to give a red solution.

*Analsis.*—Calcd. for $C_{14}H_6N_6O$: C, 61.3; H, 2.2; N, 30.6. Found: C, 62.3, 62.9; H, 3.3, 3.6; N(K), 30.5, 30.1.

Examples XII to XVI are summarized in Table I below and employ the following procedure. Two identical mixtures containing 10 parts of tricyanovinyl chloride and about 120 parts of the indicated ketone are prepared. The first part (Part A) is allowed to stand at room temperature (except as otherwise indicated) and examined after about 30 minutes. To the second part (Part B) is added about 143 parts of dimethylformamide and the resulting mixture is examined after about 30 minutes at room temperature. The colors of the two parts are indicated in the table along with the name of the dye formed which is responsive for the color.

TABLE I

| Example | Ketone | Color of Part A | Color of Part B | Dye Formed |
|---|---|---|---|---|
| XII | acetone | intense violet | intense violet | 1,1,2,6,7,7 - hexacyano - 4 - hydroxy-1,3,5-heptatriene. |
| XIII | diethyl ketone | intense blue [1] | intense blue-green | 3,5-dimethyl-1,1,2,6,7,7-hexacyano-4-hydroxy-1,3,5-heptatriene. |
| XIV | 4-methyl-2-pentanone | light blue | dark red | 1,1,2,6,7,7 - hexacyano - 4 - hydroxy - 5 - isopropyl - 1,3,5 - heptatriene. |
| XV | cyclohexanone | intense blue | intense blue | 6-(1,2,2-tricyano-ethylidene)-2-tricyanovinylcyclohexen-1-ol. |
| XVI | dibenzyl ketone | intense green-blue | intense green-blue | 3,5-diphenyl-1,1,2,6,7,7-hexacyano-4-hydroxy-1,3,5-heptatriene. |

[1] Warmed at 80° C. for a few minutes.

The process of Example VI is repeated using in place of methyl ethyl ketone the ketones shown in Table II. The indicated respective products are obtained.

TABLE II

| Ketone | Product from Reaction with 2 Moles of Tetracyanoethylene |
|---|---|
| ethyl n-propyl ketone | 5-ethyl-1,1,2,6,7,7-hexacyano-4-hydroxy-3-methyl-1,3,5-heptatriene. |
| methyl n-hexyl ketone | 1,1,2,6,7,7-hexacyano-4-hydroxy-5-n-pentyl-1,3,5-heptatriene. |
| di-n-heptadecyl ketone (stearone) | 3,5 - dihexadecyl - 1,1,2,6,7,7 - hexacyano-4-hydroxy-1,3,5-heptatriene. |
| 3,5-dimethylcyclohexanone | 3,5 - dimethyl - 6 - (1,2,2 - tricyanoethylidene)-2-tricyanovinylcyclohexen-1-ol. |
| cyclobutanone | 4-(1,2,2-tricyanoethylidene)-2-tricyanovinylcyclobuten-1-ol. |
| cycloheptanone | 7-(1,2,2-tricyanoethylidene)-2-tricyanovinylcyclohepten-1-ol. |
| di-α-mesityl ketone | 3,5-di(3,5-dimethylphenyl)-1,1,2,6,7,7-hexacyano-4-hydroxy-1,3,5-heptatriene. |
| 5-hexene-2-one (allyl acetone) | 5-allyl-1,1,2,6,7,7-hexacyano-4-hydroxy-1,3,5-heptatriene. |

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed as defined as follows:

1. Compounds represented by the formula

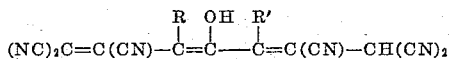

wherein R and R' taken separately are members of the class consisting of hydrogen and hydrocarbyl groups, and taken together represent a hydrocarbyl diradical.

2. 1,1,2,6,7,7-hexacyano-4-hydroxy - 5 - methyl - 1,3,5-heptatriene.

3. 5-(1,2,2-tricyanoethylidene) - 2 - tricyanovinylcyclopenten-1-ol.

4. 1,1,2,6,7,7-hexacyano-4-hydroxy - 5 - phenyl - 1,3,5-heptatriene.

5. Process which comprises reacting a ketone of the formula

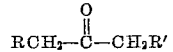

wherein R and R' taken separately are members of the class consisting of hydrogen and hydrocarbyl groups and taken together represent a hydrocarbyl diradical, with a tricyanovinyl compound of the formula

wherein X is a member of the group consisting of halogen and cyano, said tricyanovinyl compound being present initially in an amount of at least 2 moles per mole of ketone, at a temperature in the range from room temperature to 200° C.

6. Process as set forth in claim 5 wherein said reaction is effected at a temperature of at least 70° C.

7. Process as set forth in claim 5 wherein said reaction is carried out in the presence of a diluent.

8. Process as set forth in claim 5 wherein the tricyanovinyl cyanide is produced in situ from a compound of the class consisting of 1,1,2,2-tetracyanoethanesulfonic acid and salts thereof.

References Cited in the file of this patent

UNITED STATES PATENTS

| 2,717,261 | Krespan | Sept. 6, 1955 |
| 2,762,837 | Middleton | Sept. 11, 1956 |
| 2,809,972 | Middleton | Oct. 15, 1957 |